United States Patent
Yamashita et al.

(10) Patent No.: US 10,156,262 B2
(45) Date of Patent: Dec. 18, 2018

(54) JOINT STRUCTURE, CLUTCH, AND MOTOR

(71) Applicant: ASMO CO., LTD., Shizuoka-ken (JP)

(72) Inventors: Tomoki Yamashita, Hamamatsu (JP); Tomoaki Ozaki, Toyohashi (JP)

(73) Assignee: Denso Corporation, Karyia (JP)

( * ) Notice: Subject to any disclaimer, the term of this patent is extended or adjusted under 35 U.S.C. 154(b) by 413 days.

(21) Appl. No.: 14/934,825

(22) Filed: Nov. 6, 2015

(65) Prior Publication Data
US 2016/0131199 A1 May 12, 2016

(30) Foreign Application Priority Data

Nov. 12, 2014 (JP) .................. 2014-229980

(51) Int. Cl.
*F16D 15/00* (2006.01)
*F16H 1/16* (2006.01)
*F16D 3/00* (2006.01)
*F16D 3/02* (2006.01)
*F16D 3/04* (2006.01)
(Continued)

(52) U.S. Cl.
CPC ................ *F16D 3/00* (2013.01); *F16D 3/02* (2013.01); *F16D 3/04* (2013.01); *F16D 3/10* (2013.01); *F16D 43/02* (2013.01); *H02K 7/1166* (2013.01); *F16D 2300/22* (2013.01)

(58) Field of Classification Search
CPC ....................................................... F16D 3/04
See application file for complete search history.

(56) References Cited

U.S. PATENT DOCUMENTS 4,838,511 A * 6/1989 Terada ................. B60N 2/0232
248/429
6,527,642 B1 * 3/2003 Arai ..................... B62D 5/0409
180/444
(Continued)

FOREIGN PATENT DOCUMENTS

JP 2001080529 A 3/2001
JP 2007267595 A 10/2007
(Continued)

OTHER PUBLICATIONS

Japanese Office Action No. 2014-229980, dated Apr. 11, 2015, (Japanese office Action (4 pgs) and English language machine translation (3 pgs)) (7 pgs).

*Primary Examiner* — Terence Boes
(74) *Attorney, Agent, or Firm* — Patterson Thuente Pedersen, P.A.

(57) ABSTRACT

A joint structure includes a drive side insertion portion of a drive shaft, a driven side insertion portion of a driven shaft, and a coupling. The coupling includes a drive shaft insertion bore, which receives the drive side insertion portion, and a driven shaft insertion bore, which receives the driven side insertion portion. The drive shaft insertion bore includes a wall surface that engages the drive side insertion portion. The driven shaft insertion bore includes a wall surface that engages the driven side insertion portion. A drive side clearance in the drive shaft insertion bore allows the drive side insertion portion to move in the radial direction. A driven side clearance in the driven shaft insertion bore allows the driven side insertion portion to move in the radial direction.

13 Claims, 11 Drawing Sheets

(51) Int. Cl.
*F16D 3/10* (2006.01)
*F16D 43/02* (2006.01)
*H02K 7/116* (2006.01)

(56) References Cited

U.S. PATENT DOCUMENTS

| | | |
|---|---|---|
| 8,708,125 B2 | 4/2014 | Yamashita et al. |
| 2002/0158527 A1 | 10/2002 | Kawakami et al. |
| 2003/0180163 A1 | 9/2003 | Hartmann et al. |
| 2004/0164629 A1 | 8/2004 | Kawakami et al. |
| 2012/0061200 A1* | 3/2012 | Yamashita .............. F16D 43/02 192/45.001 |
| 2014/0232247 A1 | 8/2014 | Honda |

FOREIGN PATENT DOCUMENTS

| | | |
|---|---|---|
| JP | 2012062944 A | 3/2012 |
| JP | 2012082952 A | 4/2012 |
| JP | 2013078224 A | 4/2013 |

* cited by examiner

JOINT STRUCTURE, CLUTCH, AND MOTOR

RELATED APPLICATIONS

This present application claims priority to Japanese Patent Application No. 2014/229980, filed Nov. 12, 2014, said application being fully incorporated by reference in its entirety.

FIELD OF THE INVENTION

The present invention relates to a joint structure, a clutch, and a motor.

BACKGROUND OF THE INVENTION

Japanese Laid-Open Patent Publication No. 2012-82952 describes an example of a motor including a drive shaft, a driven shaft, and a clutch. When the drive shaft is rotated, the rotation of the drive shaft is transmitted to the driven shaft. The clutch connects the drive shaft and the driven shaft in an integrally rotatable manner. The clutch described in the publication includes a joint structure that connects the drive shaft and the driven shaft in an integrally rotatable manner. The drive shaft includes a distal end that is press-fitted into the joint structure. Further, the joint structure includes a coupling. The driven shaft includes a basal end that is loosely fitted to the coupling.

In the motor of the publication described above, the distal end of the drive shaft is press-fitted to the coupling. Thus, when the drive shaft wobbles, the coupling wobbles together with the drive shaft. The wobbling of the coupling is one factor that produces noise from the clutch. The term "wobble" refers to a condition in which oscillation and rotation occur at the same time.

Further, the driven shaft is loosely fitted to the coupling. This allows axial misalignment of the driven shaft and the coupling, which, in turn, allows for a certain extent of axial misalignment of the drive shaft and the drive shaft in the joint structure of the above publication. However, when the coupling wobbles together with the drive shaft, the axis of the coupling is greatly misaligned from the axis of the driven shaft. In such a case, it may be difficult to tolerate axial misalignment of the driven shaft and the coupling.

SUMMARY OF THE INVENTION

It is an object of the present invention to provide a joint structure, a clutch, and a motor that limit wobbling of the coupling.

To achieve the above object, one aspect of the present invention is a joint structure for connecting a drive shaft and a driven shaft in an integrally rotatable manner. The joint structure includes a drive side insertion portion defined by a distal portion of the drive shaft, a driven side insertion portion defined by a basal portion of the driven shaft, and a coupling including a drive shaft insertion bore, into which the drive side insertion portion is inserted, and a driven shaft insertion bore, into which the driven side insertion portion is inserted. The drive shaft insertion bore includes a wall surface engaged with the drive side insertion portion in a rotation direction, and the driven shaft insertion bore includes a wall surface engaged with the driven side insertion portion in a rotation direction. The drive shaft insertion bore includes a drive side clearance between the drive side insertion portion and the wall surface of the drive shaft insertion bore. The drive side clearance allows the drive side insertion portion to move in a radial direction inside the drive shaft insertion bore. The driven shaft insertion bore includes a driven side clearance between the driven side insertion portion and the wall surface of the driven shaft insertion bore. The driven side clearance allows the driven side insertion portion to move in a radial direction inside the driven shaft insertion bore.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
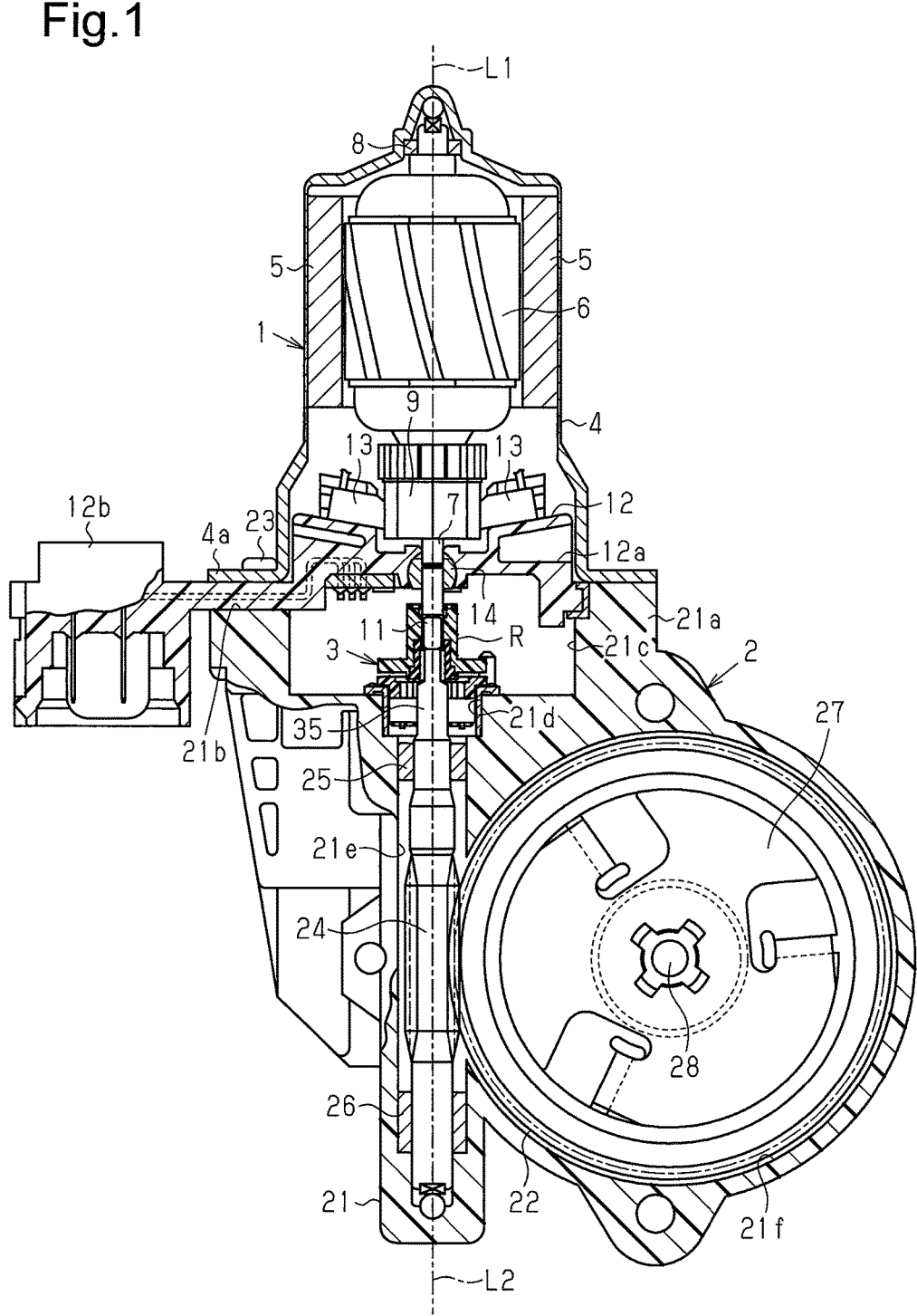
FIG. 1 is a cross-sectional view showing one embodiment of a motor.

One embodiment of a motor provided with a clutch including a joint structure will now be described. As shown in FIG. 1, the motor includes a motor unit 1, a reduction gear 2, and a clutch 3. The motor unit 1 includes a tubular yoke 4, which has a closed end. Two opposing magnets 5 are fixed to the inner surface of the yoke 4. An armature 6 is arranged at the inner side of the magnets 5. The armature 6 includes a rotation shaft 7 (drive shaft) located at the central portion of the yoke 4. The rotation shaft 7 includes a basal end (upper end as viewed in FIG. 1) supported by a bearing 8, which is arranged in the central part of the closed end of the yoke 4. A tubular commutator 9 is fixed to the distal portion of the rotation shaft 7.

Figure 2:
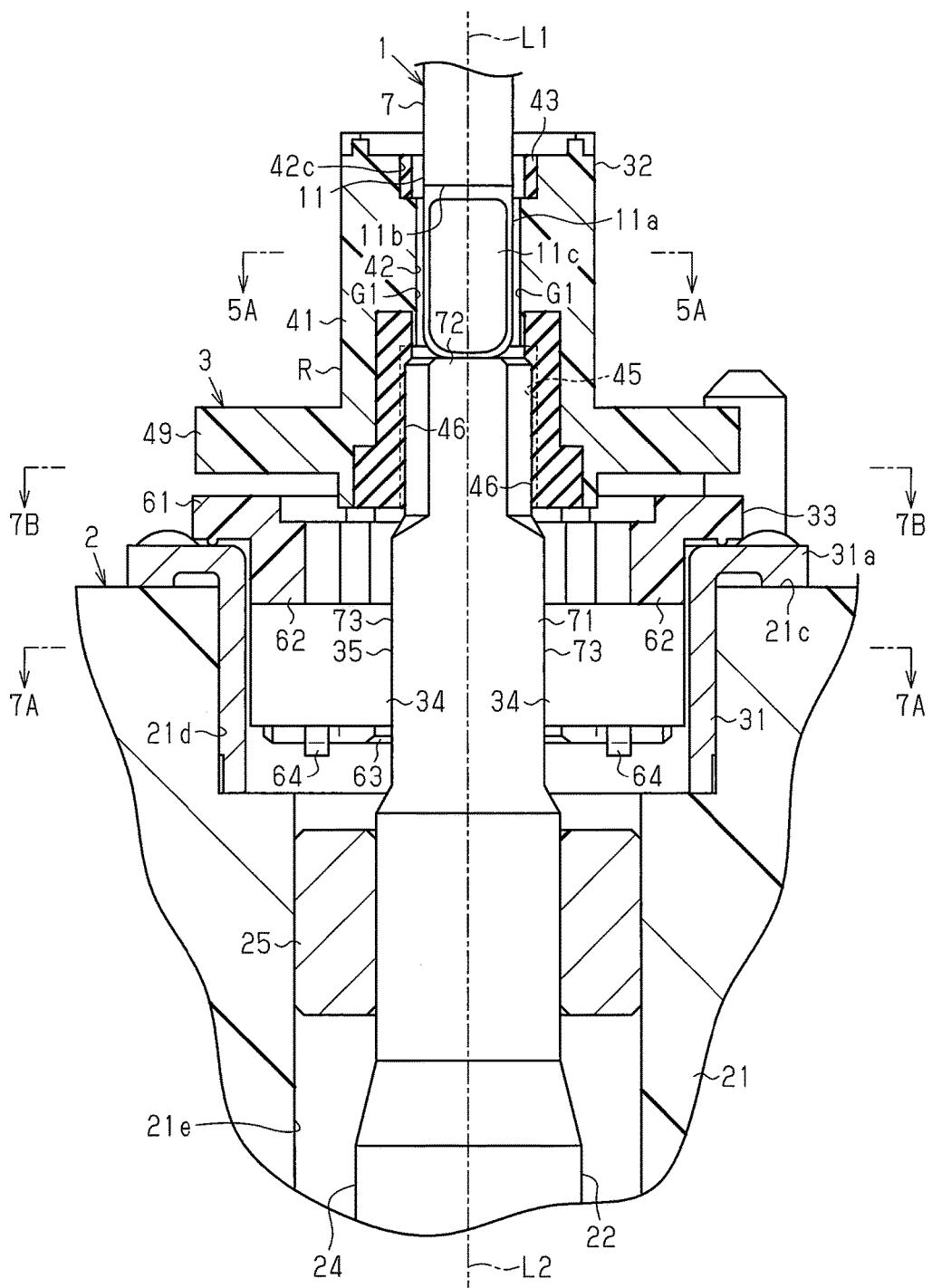
FIG. 2 is a partially enlarged cross-sectional view of the motor shown in FIG. 1.
Figure 3:
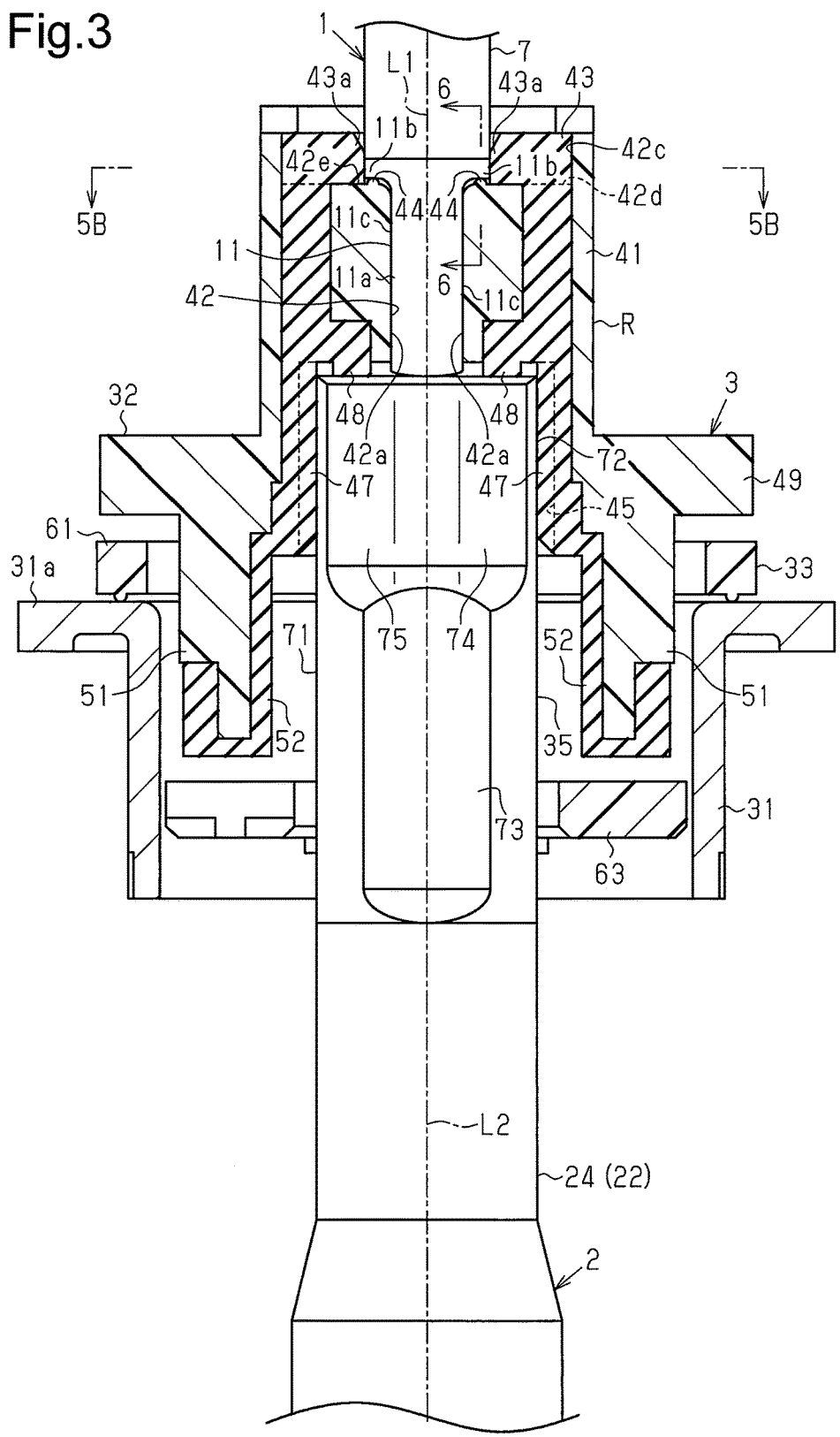
FIG. 3 is a partially enlarged cross-sectional view of the motor shown in FIG. 1.

As shown in FIGS. 2 and 3, the distal portion of the rotation shaft 7 includes a drive side insertion portion 11.

The drive side insertion portion 11 includes a shank 11a and shoulders 11b. The shank 11a is formed by cutting out two flat parallel planes from the distal portion of the cylindrical rotation shaft 7. The shoulders 11b extend from the basal end of the shank 11a toward opposite sides in the thickness-wise direction of the shank 11a. The formation of the shank 11a on the distal end of the rotation shaft 7 obtains the shoulders 11b. The two end surfaces of the shank 11a in the lateral direction define rotation transmission surfaces 11c that extend in the axial direction and a parallel to each other.

As shown in FIG. 1, a flange 4a extends toward the outer side from the open end of the yoke 4. A brush holder 12 is inserted into the open end of the yoke 4. The brush holder 12 includes a holder body 12a and a connector 12b that are formed integrally. The holder body 12a is shaped to close the open end of the yoke 4. The connector 12b projects out of the yoke 4 in the radial direction of the yoke 4. The holder body 12a includes two brushes 13 that slide along the commutator 9, which is connected to the connector 12b by wires (not shown). A bearing 14, which is paired with the bearing 8, is located at the central portion of the holder body 12a to support the portion of the rotation shaft 7 located between the commutator 9 and the drive side insertion portion 11. External power is supplied via the connector 12b to the brushes 13. The power is then supplied via the commutator 9 to the armature 6. This rotates the armature 6 and generates rotation with the motor unit 1.

The reduction gear 2 includes a gear housing 21, which is formed from a resin material, and a reduction gear mechanism 22, which is accommodated in the gear housing 21. The gear housing 21 includes a fastening portion 21a at a portion facing the motor unit 1 (an upper portion in FIG. 1). The fastening portion 21a has an outline shaped identically to the flange 4a of the yoke 4. The fastening portion 21a includes a fitting recess 21b that opens at the inner side of the yoke 4. The brush holder 12 is fitted in the fitting recess 21b, and the flange 4a is fastened to the fastening portion 21a by screws 23, with the flange 4a in contact with the fastening portion 21a. This integrates the motor unit 1 and the reduction gear 2.

The central bottom portion of the fitting recess 21b in the gear housing 21 includes a first clutch retaining recess 21c that extends in the axial direction. The central bottom portion of the first clutch retaining recess 21c includes a second clutch retaining recess 21d that extends in the axial direction. The second clutch retaining recess 21d has a smaller diameter than the first clutch retaining recess 21c. The gear housing 21 includes a worm retainer 21e that extends from the central bottom portion of the second clutch retaining recess 21d in the axial direction of the rotation shaft 7. The worm retainer 21e accommodates a rod-shaped worm 24 (driven shaft). The worm 24 is supported by two bearings 25 and 26, which are respectively arranged at the two axial ends of the worm retainer 21e. The bearings 25 and 26 support the worm 24 coaxially with the rotation shaft 7 so that the axis L1 of the rotation shaft 7 is aligned with the axis L2 of the worm 24.

The gear housing 21 includes a gear retainer 21f, which is in communication with the worm retainer 21e and located next to the middle portion of the worm retainer 21e in a direction orthogonal to the axis (rightward direction in FIG. 1). The gear retainer 21f accommodates a rotatable disk-shaped worm wheel 27, which is engaged with the worm 24. The worm wheel 27 and the worm 24 form a reduction gear mechanism 22. An output shaft 28 extends from the radially central portion of the worm wheel 27 in the axial direction of the worm wheel 27 (direction orthogonal to plane of FIG. 1) and rotates integrally with the worm wheel 27.

The first clutch retaining recess 21c and the second clutch retaining recess 21d accommodate the clutch 3 that connects the rotation shaft 7 and the worm 24. As shown in FIG. 2, the clutch 3 includes a clutch housing 31, a coupling 32, a support member 33, rollers 34, and a driven side rotor 35.

The clutch housing 31 is tubular and includes a fastening flange 31a, which extends toward the radially outer side from one axial end of the clutch housing 31. The clutch housing 31 is inserted into the second clutch retaining recess 21d until the fastening flange 31a comes into contact with the bottom surface of the first clutch retaining recess 21c. Then, the fastening flange 31a is fastened to the bottom portion of the first clutch retaining recess 21c. The clutch housing 31 is fixed to the gear housing 21 so that movement in the axial direction and rotation in the circumferential direction are restricted relative to the gear housing 21. The clutch housing 31, which is fixed to the gear housing 21, is arranged coaxially with the rotation shaft 7 and the worm 24.

Figure 4:
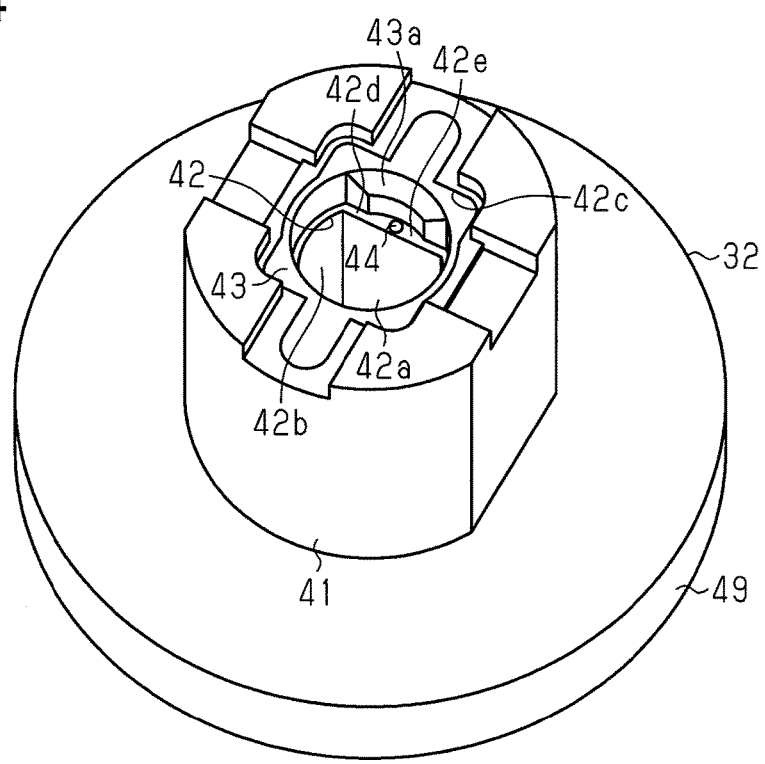
FIG. 4 is a perspective view of a coupling shown in FIG. 3.
Figure 5A:
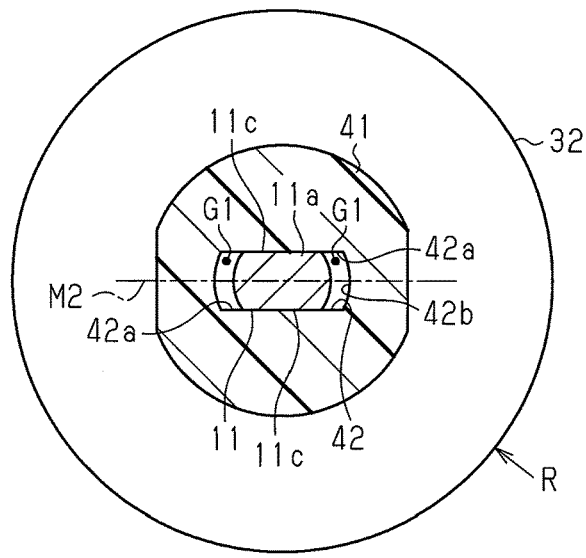
FIG. 5A is a schematic cross-sectional view showing a clutch taken along line 5A-5A in FIG. 2.
Figure 5B:
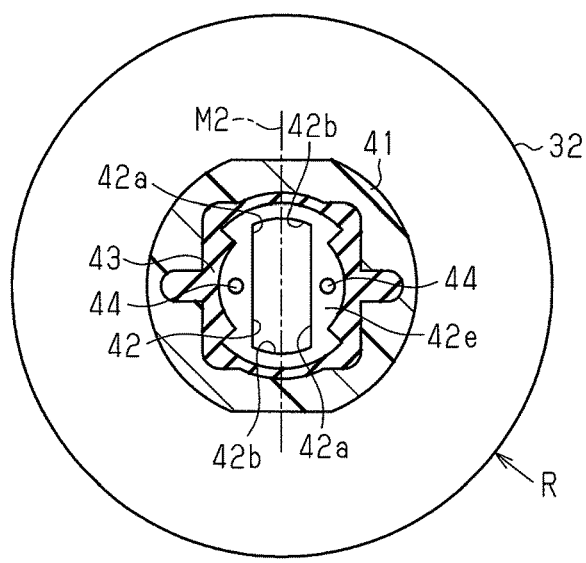
FIG. 5B is a schematic cross-sectional view showing the clutch taken along line 5B-5B in FIG. 3, in which a rotation shaft is not shown in order to facilitate understanding of the shape of an abutment surface.
Figure 6:
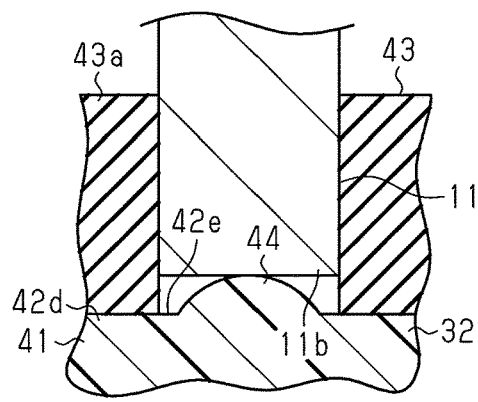
FIG. 6 is a partially enlarged cross-sectional view of the clutch shown in FIG. 4.

As shown in FIGS. 2 and 4, the coupling 32 includes a shaft coupling portion 41, which is generally tubular and has a smaller outer diameter than the inner diameter of the clutch housing 31. The radially central part of the shaft coupling portion 41 includes a drive shaft insertion bore 42, which extends in the axial direction. The drive shaft insertion bore 42 extends from the axial end of the shaft coupling portion 41 that is closer to the motor unit 1 (upper side in FIG. 2) to an axially middle part of the shaft coupling portion 41. The drive shaft insertion bore 42 extends in a longitudinal direction and a lateral direction as viewed in the axial direction. As shown in FIG. 5, the wall surface of the drive shaft insertion bore 42 includes two parallel flat surfaces 42a and two arcuate connection surfaces 42b. The flat surfaces 42a are spaced apart in the radial direction and extend in the axial direction. The arcuate connection surfaces connect the ends of the flat surfaces 42a. In this manner, the drive shaft insertion bore 42 is defined by two parallel flat planes. With regard to the drive shaft insertion bore 42, as viewed from the axial direction, the direction in which the flat surfaces 42a extend (sideward direction in FIG. 5) is referred to as the longitudinal direction, and the direction orthogonal to the flat surfaces 42a (vertical direction in FIG. 5) is referred to as the lateral direction. The drive shaft insertion bore 42 has a length in the lateral direction that is slightly greater than or equal to that of the shank 11a of the drive side insertion portion 11. Further, the drive side insertion portion 11 has a length in the longitudinal direction (sideward direction in FIG. 5) that is greater than that of the shank 11a.

As shown in FIGS. 2 to 4, the portion of the drive shaft insertion bore 42 open near the motor unit 1 defines a large diameter portion 42c. The large diameter portion 42c forms a step 42d in the end of the drive shaft insertion bore 42 near the motor unit 1. The step 42d includes a flat abutment surface 42e that opposes the motor unit 1 and extends orthogonal to the axial direction. The abutment surface 42e serves as the boundary of the drive shaft insertion bore 42 and the large diameter portion 42c.

A drive side elastic member 43 is arranged on the wall surface of the large diameter portion 42c. The drive side elastic member 43 is annular and arranged in the large diameter portion 42c at the radially outer side of the wall surface of the drive shaft insertion bore 42. The drive side elastic member 43 includes two pushing portions 43a projecting toward the inner side in the radial direction. The pushing portions 43a are each located on the abutment surface 42e at one of the two lateral sides of the drive shaft insertion bore 42. Each pushing portion 43a is annular and extends in the circumferential direction (rotation direction of coupling 32).

As shown in FIGS. 3, 4, 5B, and 6, two toleration projections 44 are formed on the abutment surface 42e at opposite sides of the drive shaft insertion bore 42 in the lateral direction. Each toleration projection 44, which projects in the axial direction, is located at the radially inner side of one of the pushing portions 43a. In the present embodiment, each toleration projection 44 has a spherical surface.

As shown in FIGS. 2, 3, and 5, the drive side insertion portion 11 of the rotation shaft 7 is inserted into the drive shaft insertion bore 42. In detail, the shank 11a of the drive side insertion portion 11 is inserted into the drive shaft insertion bore 42. The shank 11a is inserted into the drive shaft insertion bore 42 so that the lateral direction of the shank 11a coincides with the lateral direction of the drive shaft insertion bore 42 and so that the rotation transmission surfaces 11c, which are located at the two lateral sides of the shank 11a, are opposed to and contact the flat surfaces 42a. The rotation transmission surfaces 11c and the flat surfaces 42a are in contact at the two lateral ends of the drive shaft insertion bore 42 and are in engagement in the rotation direction. Thus, the drive side insertion portion 11 and the coupling 32 are integrally rotatable. The two flat surfaces 42a restrict movement of the shank 11a relative to the coupling 32 in the lateral direction of the drive shaft insertion bore 42. The two shoulders 11b are inserted into the large diameter portion 42c and abut against the distal end of the corresponding toleration projections 44 in the large diameter portion 42c. The outer surface of the part of the drive side insertion portion 11 inserted into the large diameter portion 42c contacts the two pushing portions 43a of the drive side elastic member 43. The two pushing portions 43a push the drive side insertion portion 11 toward the inner side in the radial direction from the two lateral sides of the drive shaft insertion bore 42. The drive side elastic member 43 does not push the drive side insertion portion 11 in the longitudinal direction of the drive shaft insertion bore 42 when the rotation shaft 7 and the coupling 32 are in alignment.

Referring to FIG. 5, the length of the drive shaft insertion bore 42 in the longitudinal direction is greater than that of the shank 11a of the drive side insertion portion 11. This forms drive side clearances G1 between the wall surface (connection surfaces 42b) of the drive shaft insertion bore 42 and the shank 11a to allow radial movement of the shank 11a in the drive shaft insertion bore 42. The drive side clearances G1 are formed at the longitudinal ends of the drive shaft insertion bore 42 to allow longitudinal movement of the shank 11a in the drive shaft insertion bore 42.

As shown in FIG. 2, the radially central part of the shaft coupling portion 41 includes a driven shaft insertion bore 45 that extends in the axial direction. The driven shaft insertion bore 45, which is in communication with the drive shaft insertion bore 42, extends from the end (lower end as viewed in FIG. 2) of the shaft coupling portion 41 that is closer to the reduction gear 2 to the axially middle portion of the shaft coupling portion 41. Referring to FIG. 7B, the driven shaft insertion bore 45 extends in a longitudinal direction and a lateral direction as viewed in the axial direction. The wall surface of the driven shaft insertion bore 45 includes two parallel drive side transmission surfaces 45a and two connection surfaces 45b. The drive side transmission surfaces 45a are spaced apart in the radial direction. The connection surfaces 45b connect the two ends of the drive side transmission surfaces 45a. In this manner, the driven shaft insertion bore 45 is defined by two parallel flat planes. With regard to the driven shaft insertion bore 45, as viewed from the axial direction, the direction in which the drive side transmission surfaces 45a extend (sideward direction in FIG. 7B) is referred to as the longitudinal direction, and the direction orthogonal to the drive side transmission surfaces 45a (vertical direction in FIG. 7B) is referred to as the lateral direction. The axis of the driven shaft insertion bore 45 coincides with the axis of the drive shaft insertion bore 42. The driven shaft insertion bore 45 is shifted from the drive shaft insertion bore 42 by 90° in the rotation direction of the coupling 32 (same rotation direction as rotation shaft 7). That is, the longitudinal direction of the driven shaft insertion bore 45 is shifted from the longitudinal direction of the drive shaft insertion bore 42 by 90° in the rotation direction of the coupling 32 (same rotation direction as rotation shaft 7). Accordingly, as viewed from the axial direction of the coupling 32, a center line M1 of the drive shaft insertion bore 42 extending through the laterally central part of the drive shaft insertion bore 42 in the longitudinal direction is orthogonal to a center line M2 of the driven shaft insertion bore 45 extending through the laterally central part of the driven shaft insertion bore 45 in the longitudinal direction.

Buffers 46, which are formed from an elastic material such as rubber, are arranged on each drive side transmission surface 45a. The buffers 46 are formed at two locations on each drive side transmission surface 45a and spaced apart in the direction in which the center line M2 of the driven shaft insertion bore 45 extends. Each buffer 46 projects from the corresponding drive side transmission surface 45a slightly toward the inner side of the driven shaft insertion bore 45. The buffers 46 are formed on the drive side transmission surfaces 45a at locations corresponding to where a first driven side transmission surface 74 and a second driven side transmission surface 75, which will be described later, abut against.

A driven side elastic member 47, which is formed from an elastic material such as rubber, is arranged on each connection surface 45b of the driven shaft insertion bore 45. The driven side elastic member 47, which extends in the axial direction, is located at the circumferentially central part of each connection surface 45b. The driven side elastic member 47 projects from the corresponding connection surface 45b toward the inner side of the driven shaft insertion bore 45.

As shown in FIG. 3, an axial buffer 48, which is formed from an elastic material such as rubber, is located at the axial end of the driven shaft insertion bore 45 that is closer to the drive shaft insertion bore 42. The axial buffer 48 projects into the driven shaft insertion bore 45 in the axial direction from the axial end of the driven shaft insertion bore 45 that is closer to the drive shaft insertion bore 42 and is located at the radially outer side of the drive shaft insertion bore 42.

An annular flange 49 is formed integrally with the end of the shaft coupling portion 41 that is closer to the driven shaft insertion bore 45. The flange 49 extends toward the outer side in the radial direction from the shaft coupling portion 41. The outer diameter of the flange 49 is slightly larger than the inner diameter of the clutch housing 31. Two roller unlocking portions 51 are formed integrally with the flange 49. The two roller unlocking portions 51 are respectively formed at the two sides of the driven shaft insertion bore 45 in the longitudinal direction (direction in which center line M2 extends in FIG. 7B). Further, the two roller unlocking portions 51 extend from the flange 49 in the axial direction away from the drive shaft insertion bore 42. The two roller unlocking portions 51 are located at positions spaced apart by an interval of 180° in the circumferential direction. A shock absorber 52 covers the radially inner surface, radially outer surface, and two circumferential side surfaces of each roller unlocking portion 51. The shock absorber 52 comprises a material such as rubber having elasticity. The shock absorbers 52, the drive side elastic member 43, the buffers 36, the driven side elastic members 47, and the axial buffer 48 are molded integrally with a portion of the coupling 32 that is formed from a resin material other than that of the shock absorbers 52, the drive side elastic member 43, the buffers 36, the driven side elastic members 47, and the axial buffer 48. Each roller unlocking portion 51 including the corresponding shock absorber 52 has the form of a rectangular plate in which the radially outer surface is arcuate and the radially inner surface is flat.

In the coupling 32, the shaft coupling portion 41 and the flange 49 are located outside the clutch housing 31 (more specifically, between the clutch housing 31 and the brush holder 12). Further, the two roller unlocking portions 51 have distal ends that are inserted into the clutch housing 31. The distal ends of the roller unlocking portions 51 located inside the clutch housing 31 are opposed to the wall surface of the clutch housing 31 in the radial direction.

Figure 7A:
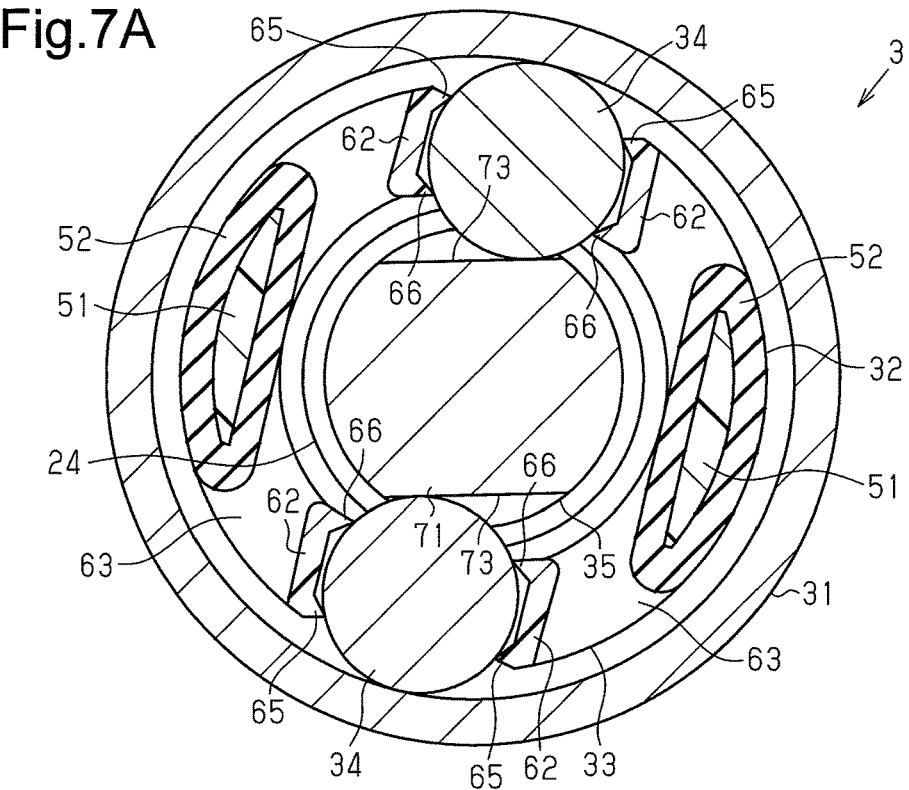
FIG. 7A is a cross-sectional view of the clutch taken along line 7A-7A in FIG. 2.
Figure 7B:
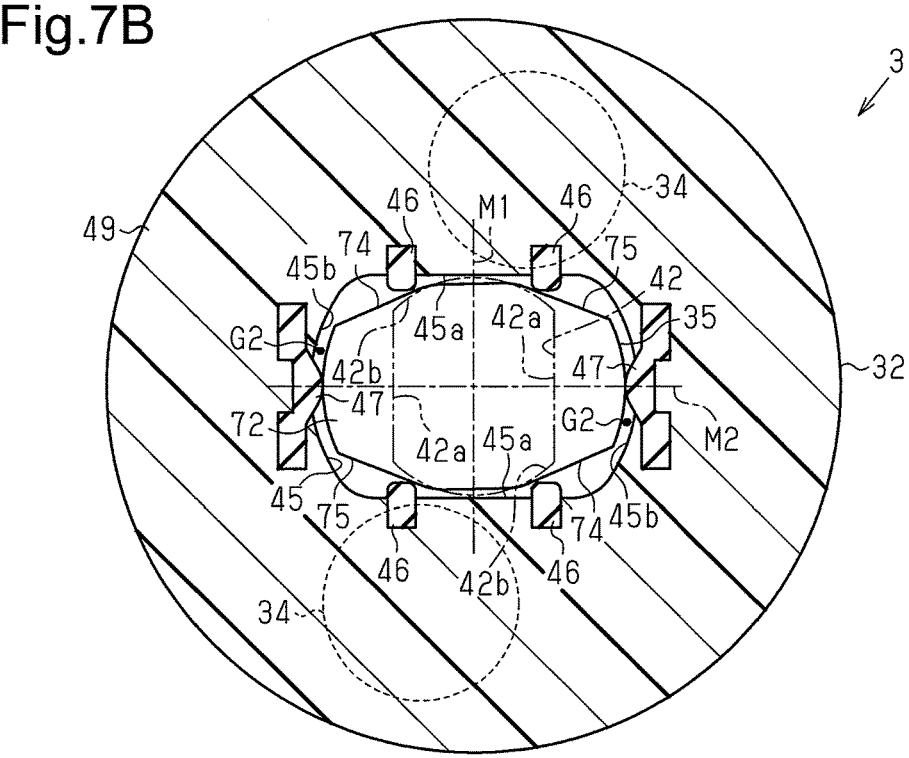
FIG. 7B is a cross-sectional view of the clutch taken along line 7B-7B in FIG. 2.

Referring to FIGS. 2 and 7A, the support member 33 is formed from a resin material. The support member 33 includes a ring 61, which has the same outer diameter as the flange 49 of the coupling 32. The ring 61 includes pairs of roller supports 62 located at two positions that are separated in the circumferential direction of the ring 61 by an interval of 180°. The roller supports 62 in each pair extend in the axial direction from the inner edge of the ring 61 and are spaced apart from each other in the circumferential direction. The distal ends of the roller supports 62 in the two pairs are connected by an arcuate reinforcement 63. The distal end of each roller support 62 in each pair includes a holding claw 64 that projects toward the other roller support 62 in the circumferential direction.

The opposing surfaces of the roller supports 62 in each pair include outer holding portions 65 and inner holding portions 66. The opposing surfaces of the roller supports 62 in each pair includes the outer holding portions 65 on the radially outer ends of the opposing surfaces and the inner holding portions 66 on the radially inner ends of the opposing surfaces. The outer holding portions 65 and the inner holding portions 66 project toward the middle of the two roller supports 62. The outer holding portion 65 and the inner holding portion 66 each have a triangular cross-section in a direction orthogonal to the axial direction. The triangular cross-sections narrows in the radial direction toward the middle of the roller supports 62 in each pair. Each roller support 62 is elastically deformable.

The rollers 34 are fitted into the two pairs of the roller supports 62 in the support member 33. Each roller 34 is cylindrical. In each pair of the roller supports 62, the outer holding portions 65 contact the corresponding roller 34 from the outer side in the radial direction, and the inner holding portions 66 contact the corresponding roller 34 from the inner side in the radial direction. Thus, each roller 34 is held between the corresponding pair of the roller supports 62. The roller supports 62, which include the outer holding portions 65 and the inner holding portions 66, restrict movement of the rollers 34 relative to the support member 33 in the radial direction and the circumferential direction. Each roller 34 is held to be rotatable about its axis by the corresponding pair of the supports 33. The two rollers 34 are held generally parallel to each other at equal intervals (interval of 180° in the present embodiment) by the pairs of the corresponding roller supports 62. The holding claws 64 restrict separation of the rollers 34 from the support member 33.

Figure 8A:
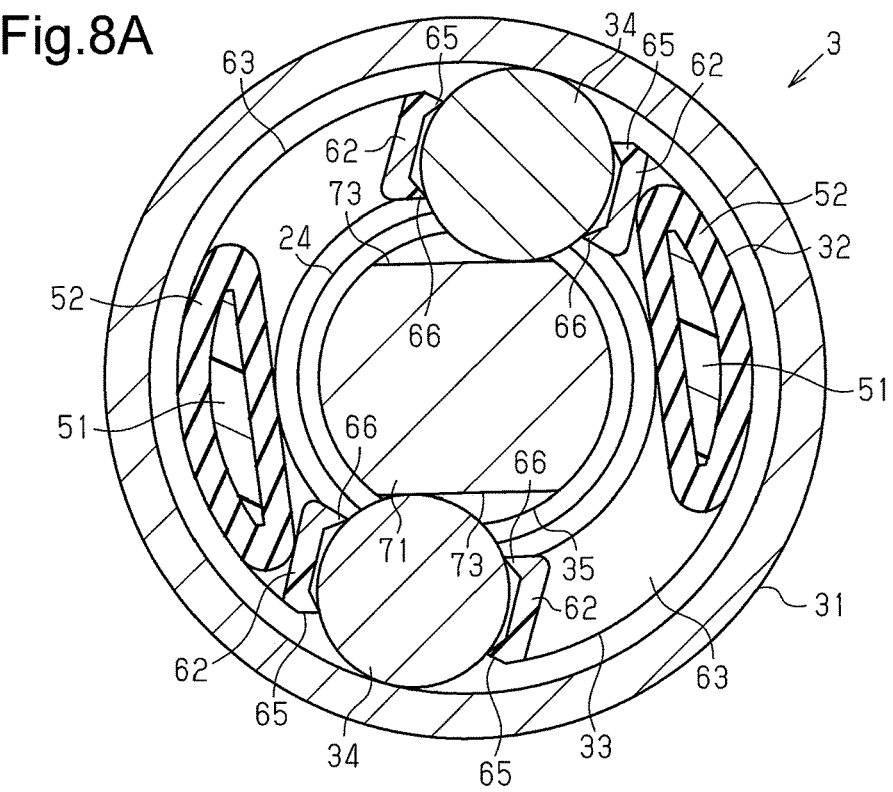
FIGS. 8A and 8B are cross-sectional views of the clutch shown in FIG. 2.

The support member 33, which holds the two rollers 34, is inserted into the clutch housing 31. The ring 61 of the support member 33 contacts the fastening flange 31a of the clutch housing 31 from a location near the motor unit 1. The roller supports 62, into which the rollers 34 are fitted, are inserted into the clutch housing 31. The two roller unlocking portions 51 of the coupling 32 are inserted into the ring 61 and located between the two pairs of the roller supports 62. The support member 33 and the coupling 32 are rotatable relative to each other in the circumferential direction. As shown in FIGS. 7A and 8A, rotation of the coupling 32 relative to the support member 33 allows each roller unlocking portion 51 to contact the roller support 62 located in front of the roller unlocking portion 51 in the rotation direction (circumferential direction) of the coupling 32. The rollers 34 in the clutch housing 31 can contact the inner surface of the clutch housing 31.

As shown in FIGS. 2 and 3, the driven side rotor 35 is formed on the basal end of the worm 24. The driven side rotor 35 includes a driven side control portion 71 and a driven side insertion portion 72 that are arranged next to each other in the axial direction.

The driven side control portion 71 is cylindrical and extends in the axial direction of the worm 24 at the basal end of the worm 24. The axis of the driven side control portion 71 coincides with the axis L2 of the worm 24. Thus, the driven side control portion 71 is coaxial with the worm 24. The driven side control portion 71 has an outer diameter set to be less than or equal to the maximum diameter of the worm 24. In the present embodiment, the outer diameter of the driven side control portion 71 is set to be less than or equal to the outer diameter of the worm 24 at the portion supported by the bearing 25. As shown in FIG. 7A, the outer surface of the driven side control portion 71 includes two control surfaces 73. The control surfaces 73 are formed at two locations on the outer surface of the driven side control portion 71 and separated in the circumferential direction by an equal angular interval (interval of 180° in the present embodiment). Further, the two control surfaces 73 are flat, parallel, and extend in the axial direction. Each control surface 73 is longer in the axial direction than the rollers 34.

Referring to FIG. 2, the driven side insertion portion 72 is formed integrally with the axial end of the driven side control portion 71 opposite to the axially middle portion of the worm 24. More specifically, the driven side insertion portion 72 is formed toward the basal side of the worm 24 from the driven side control portion 71. The driven side control portion 71 and the driven side control portion 71 are continuously formed in the axial direction. The driven side insertion portion 72 is cylindrical, extends in the axial direction of the worm 24, and has an axis that coincides with the axis L2 of the worm 24. Thus, the driven side insertion portion 72 is coaxial with the worm 24. The driven side insertion portion 72 is slightly longer in the axial direction than the driven shaft insertion bore 45. The outer diameter of the driven side insertion portion 72 is set to be less than or equal to the maximum diameter of the worm 24. In the present embodiment, the outer diameter of the driven side insertion portion 72 is smaller than the outer diameter at the portion of the worm 24 supported by the bearing 25 (i.e., smaller than outer diameter of driven side control portion 71). Further, the driven side insertion portion 72 is slightly narrower than the driven shaft insertion bore 45.

Referring to FIG. 7B, the driven side insertion portion 72 has an elliptic cross-section in a direction orthogonal to the axial direction. This cross-sectional shape is uniform in the axial direction. Referring to FIGS. 7A and 7B, when viewing the driven side insertion portion 72 from the axial direction, the longitudinal direction of the driven side insertion portion 72 (sideward direction in FIG. 7B) extends parallel to the control surfaces 73, and the lateral direction of the driven side insertion portion 72 (vertical direction in FIG. 7B) extends orthogonal to the control surfaces 73. As viewed in the axial direction, the driven side insertion portion 72 is shorter than the driven shaft insertion bore 45 in the longitudinal direction (sideward direction in FIG. 7B). As shown in FIG. 2, the driven side insertion portion 72 is slightly longer than the drive side transmission surfaces 45a in the axial direction.

As shown in FIG. 7B, the outer surface of the driven side insertion portion 72 includes two first driven side transmission surfaces 74 and two second driven side transmission surfaces 75. One of the two first driven side transmission surfaces 74 is located 180° opposite to the other one of the first driven side transmission surfaces 74. The two first driven side transmission surfaces 74 are flat, parallel to each other, and extend in the axial direction. The distance between the two first driven side transmission surfaces 74 is equal to the distance between the two drive side transmission surfaces 45a in the driven shaft insertion bore 45 of the coupling 32. The second driven side transmission surfaces 75 are formed between the two first driven side transmission surfaces 74. One of the two second driven side transmission surfaces 75 is located 180° opposite to the other one of the second driven side transmission surfaces 75. The two second driven side transmission surfaces 75 are flat, parallel to each other, and extend in the axial direction. The distance between the two second driven side transmission surfaces 75 is equal to the distance between the two drive side transmission surfaces 45a in the driven shaft insertion bore 45 of the coupling 32. The first driven side transmission surfaces 74 and the second driven side transmission surfaces 75 extend in the axial direction from one end to the other end of the driven side insertion portion 72.

Referring to FIGS. 2 and 7A, the driven side rotor 35 is inserted into the clutch housing 31 and the support member 33 from the side opposite to the coupling 32. The driven side insertion portion 72 is inserted into the driven shaft insertion bore 45 of the coupling 32. The driven side control portion 71 is arranged between the two rollers 34, which are held by the support member 33. The driven side rotor 35 is arranged coaxially with the clutch housing 31, the coupling 32, and the support member 33.

Referring to FIGS. 3 and 7B, the driven side insertion portion 72 is loosely fitted into the driven shaft insertion bore 45 and rotatable integrally with the coupling 32. The distal end surface of the driven side insertion portion 72 (i.e., basal end surface of worm 24) is in contact in the axial direction with the distal end surface of the drive side insertion portion 11 (i.e., distal end surface of shank 11a), which is located in the drive shaft insertion bore 42. The axial buffer 48 is in contact in the axial direction with the distal end surface of the driven side insertion portion 72 (basal end surface of worm 24). The driven side elastic members 47 and the buffers 46 are located between the outer surface of the driven side insertion portion 72 and the wall surface of the driven shaft insertion bore 45 that are opposed to each other in the radial direction. The two driven side elastic members 47 contact the driven side insertion portion 72 in the driven shaft insertion bore 45 from the two longitudinal sides of the driven shaft insertion bore 45. The four buffers 46 are located between the drive side transmission surfaces 45a and the first and second driven side transmission surfaces 74 and 75.

When the coupling 32 rotates about its axis relative to the driven side rotor 35, the drive side transmission surfaces 45a contact the opposing one of the first driven side transmission surfaces 74 and the second driven side transmission surfaces 75. This elastically deforms the buffers 46 located between the drive side transmission surfaces 45a and the first and second driven side transmission surfaces 74 and 75. At the same time, the drive side transmission surfaces 45a each contact the one of the first and second driven side transmission surfaces 74 and 75 that is located toward the front in the rotation direction. The driven side insertion portion 72 is rotatable integrally with the coupling 32 because the first driven side transmission surfaces 74 or the second driven side transmission surfaces 75 contacts and engages the drive side transmission surfaces 45a, which define the two lateral ends of the driven shaft insertion bore 45, in the rotation direction. That is, engagement of the coupling 32 and the driven side rotor 35 in the rotation direction transmits the rotational drive force of the coupling 32 to the driven side rotor 35. The drive side insertion portion 11 is inserted in the coupling 32. Thus the coupling 32 connects the worm 24, which includes the driven side insertion portion 72, and the rotation shaft 7 in an integrally rotatable manner. The joint structure R, which connects the rotation shaft 7 and the worm 24 in an integrally rotatable manner, includes the drive side insertion portion 11, the drive side insertion portion 11, the coupling 32, and the driven side insertion portion 72.

As viewed in the axial direction, the driven shaft insertion bore 45 is longer than the driven side insertion portion 72 in the longitudinal direction (sideward direction in FIG. 7B). This forms a driven side clearance G2 between the wall surface of the driven shaft insertion bore 45 (connection surfaces 45b) and the driven side insertion portion 72. The drive side clearance G2 allows the driven side insertion portion 72 to move in the radial direction inside the driven shaft insertion bore 45. The drive side clearance G2, which is formed at the longitudinal ends of the driven shaft insertion bore 45, allows the driven side insertion portion 72 to move inside the driven shaft insertion bore 45 in the longitudinal direction of the driven shaft insertion bore 45. When the driven side insertion portion 72 moves inside the driven shaft insertion bore 45 in the longitudinal direction of the driven shaft insertion bore 45, the driven side insertion portion 72 moves as it elastically deforms the driven side elastic member 47. The gap between the wall surface of the driven shaft insertion bore 45 and the driven side insertion portion 72 in the longitudinal direction of the driven shaft insertion bore 45 (i.e., driven side clearance G2) is greater in width than the gap between the wall surface of the driven shaft insertion bore 45 and the driven side insertion portion 72 in the lateral direction of the driven side insertion portion 72.

As shown in FIG. 7A, the driven side control portion 71 is inserted into the support member 33 so that the rollers 34 are located between the control surfaces 73 and the inner surface of the clutch housing 31. The distance between each control surface 73 and the inner surface of the clutch housing 31 in the direction orthogonal to the control surface 73 varies in the rotation direction of the driven side rotor 35. In the present embodiment, the distance between each control surface 73 and the inner surface of the clutch housing 31 is longest at the circumferentially central part of the control surface 73. Further, the distance between each control surface 73 and the inner surface of the clutch housing 31 gradually decreases from the circumferentially central part of the control surface 73 toward the circumferential ends of the control surface. The distance between the circumferentially central part of the control surface 73 and the inner surface of the clutch housing 31 is longer than the diameter of the rollers 34. The distance between the circumferential end of each control surface 73 and the inner surface of the clutch housing 31 is shorter than the diameter of the rollers 34.

The operation of the motor will now be described focusing on the operation of the clutch 3. Referring to FIG. 1, when the motor unit 1 stops operating, that is, when the rotation shaft 7 and the coupling 32 are both not rotated, a device connected to the output shaft 28 may apply load to the output shaft 28. The load may act to rotate the driven side rotor 35 (worm 24). As a result, referring to FIG. 7A, the control surfaces 73 of the driven side rotor 35 push the rollers 34, which are located between the control surfaces 73 and the inner surface of the clutch housing 31, toward the other side in the radial direction. The rollers 34, which are pushed by the control surfaces 73, elastically deform the roller supports 62, which hold the rollers 34, and force the outer holding portions 65 to move away from each other. Consequently, the rollers 34 move toward the outer side and contact the inner surface of the clutch housing 31. The rollers 34 are held between the control surfaces 73 and the inner surface of the clutch housing 31. FIG. 7A shows the clutch 3 when the driven side rotor 35 acts to rotate in the counterclockwise direction. The clutch housing 31 is not rotatable in the circumferential direction. Thus, the clutch housing 31 and the rollers 34 restrict further rotation of the driven side rotor 35. This restricts rotation of the worm 24 and limits rotation of the rotation shaft 7 that is caused by the worm 24. The portion of each control surface 73 that contacts the corresponding roller 34 is located toward the circumferential end of the control surface 73 from the circumferentially central part of the control surface 73. FIG. 7A shows an example in which the driven side rotor 35 acts to rotate in the counterclockwise direction. Rotation of the driven side rotor 35 is restricted in the same manner when the driven side rotor 35 acts to rotate in the clockwise direction.

Figure 8B:
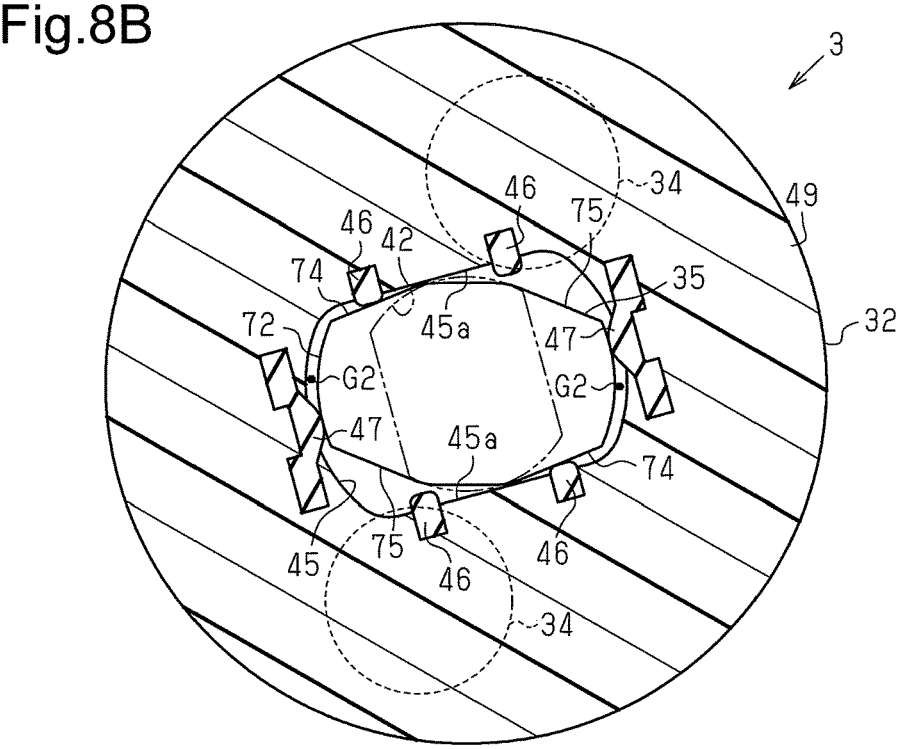

Referring to FIGS. 8A and 8B, when the motor unit 1 is driven, that is, when the rotation shaft 7 is rotated, the coupling 32 is rotated integrally with the rotation shaft 7 about the axis L1 of the rotation shaft 7 (refer to FIG. 2). FIGS. 8A, 8B, 9A, and 9B show the clutch 3 when the rotation shaft 7 and the coupling 32 are rotated in the counterclockwise direction. The coupling 32 is rotated relative to the support member 33, which remains still. Each roller unlocking portion 51 of the coupling 32 contacts and pushes the roller support 62 located in front of the roller unlocking portion 51 in the rotation direction. The rollers 34, which are held by the roller supports 62, are then released from between the clutch housing 31 and the control surfaces 73. This unlocks the driven side rotor 35. Under this situation, the drive side transmission surfaces 45a of the coupling 32 are not in contact with the first driven side transmission surfaces 74 of the driven side rotor 35. Thus, the driven side rotor 35 remains still. The rollers 34, which have been released from between the control surfaces 73 and the inner surface of the clutch housing 31, are pushed back toward the inner side in the radial direction by the two outer holding portions 65 in each of the pairs of the roller supports 62 that move toward each other to restore their original forms. The outer holding portions 65 and the inner holding portions 66 of the roller supports 62 restrict movement of the rollers 34 relative to the support member 33 in the radial direction and the circumferential direction.

Figure 9A:
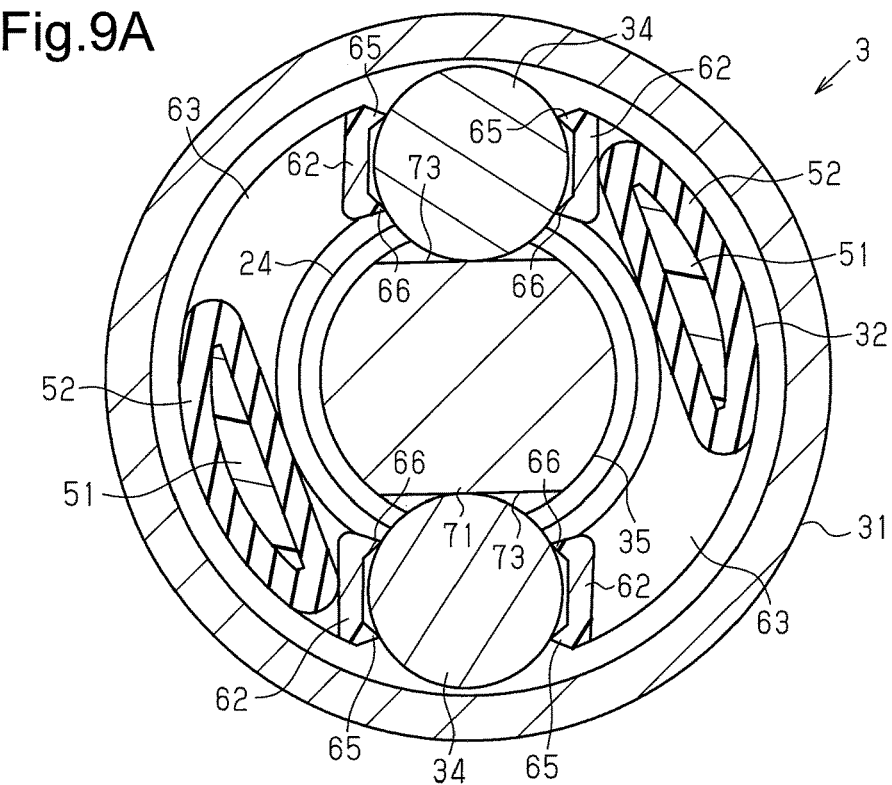
FIGS. 9A and 9B are cross-sectional views of the clutch shown in FIG. 2.
Figure 9B:
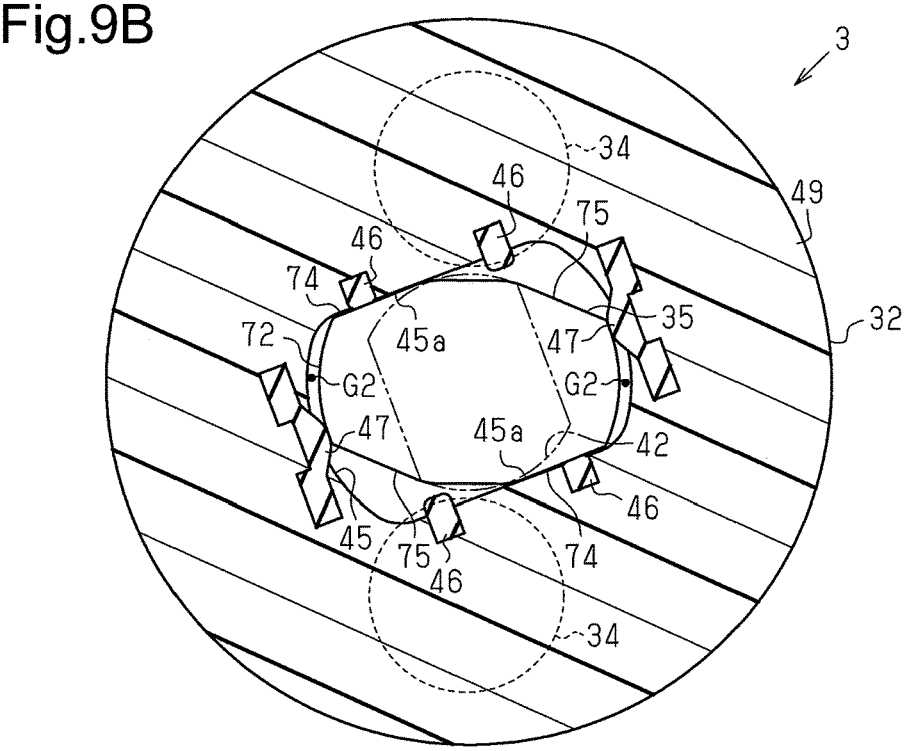

Referring to FIG. 9B, when the rotation shaft 7 further rotates the coupling 32, the drive side transmission surfaces 45a elastically deform the buffers 46, which are located between the drive side transmission surfaces 45a and the first driven side transmission surfaces 74, and contact the first driven side transmission surfaces 74 in the rotation direction. That is, the drive side transmission surfaces 45a of the coupling 32 and the first driven side transmission surfaces 74 of the driven side insertion portion 72 are engaged in the rotation direction. This allows for the transmission of rotation drive force from the coupling 32 via the drive side transmission surfaces 45a and the first driven side transmission surfaces 74 to the driven side insertion portion 72. Thus, the driven side rotor 35 is rotated together with the coupling 32 about its axis (axis L2 of worm 24). Referring to FIG. 9A, this rotates the support member 33, which is pushed by the roller unlocking portions 51, integrally with the coupling 32. Thus, the rollers 34 are rotated together with the driven side rotor 35 and guided by the support member 33. In detail, the rollers 34 are held by the roller supports 62 and arranged at the circumferentially central part of the corresponding control surfaces 73. The rollers 34, which are released from the inner surface of the clutch housing 31 and the control surfaces 73, are rotated together with the driven side rotor 35 about the axis of the driven side rotor 35 while being held by the support member 33.

Referring to FIG. 1, when the worm 24 rotates as the driven side rotor 35 rotates, the worm 24 and the worm wheel 27 reduces the speed of the rotation and outputs the rotation from the output shaft 28. FIGS. 8A, 8B, 9A, and 9B show the clutch 3 when the coupling 32 is rotated in the counterclockwise direction. Rotational drive force is transmitted in the same manner from the coupling 32 to the driven side insertion portion 72 when the coupling 32 is rotated in the clockwise direction. In FIGS. 8A, 8B, 9A, and 9B, the drive side transmission surfaces 45a contact the second driven side transmission surfaces 75 when the coupling 32 is rotated in the clockwise direction.

The operation of the present embodiment will now be described. The drive side insertion portion 11, which is defined by the distal portion of the rotation shaft 7, is inserted into the drive shaft insertion bore 42 of the coupling 32. This connects the rotation shaft 7 and the coupling 32 in an integrally rotatable manner. The driven side insertion portion 72, which is defined by the basal portion of the worm 24, is inserted into the driven shaft insertion bore 45 of the coupling 32. This connects the worm 24 and the coupling 32 in an integrally rotatable manner. In this manner, the clutch 3 having the joint structure R, which includes the coupling 32 connected to each of the rotation shaft 7 and the worm 24 in an integrally rotatable manner, connects the rotation shaft 7 and the worm 24 in an integrally rotatable manner.

Each longitudinal end of the driven shaft insertion bore 45 includes the driven side clearance G2 between the driven side insertion portion 72 and the wall surface of the driven shaft insertion bore 45. Thus, the driven side insertion portion 72 is movable in the longitudinal direction of the driven shaft insertion bore 45 within the range of the driven side clearance G2. Each longitudinal end of the drive shaft insertion bore 42 includes the drive side clearance G1 between the drive side insertion portion 11 and the wall surface of the drive shaft insertion bore 42. Thus, the drive side insertion portion 11 is movable in the longitudinal direction of the drive shaft insertion bore 42 within the range of the drive side clearance G1. Accordingly, the driven side insertion portion 72 is movable in the driven shaft insertion bore 45 in the radial direction (longitudinal direction of driven shaft insertion bore 45 in present embodiment). Further, the drive side insertion portion 11 is movable in the drive shaft insertion bore 42 in the radial direction (longitudinal direction of drive shaft insertion bore 42 in present embodiment). Thus, even when the rotation shaft 7 wobbles, the drive side insertion portion 11 moves in the drive shaft insertion bore 42 in the longitudinal direction of the drive shaft insertion bore 42. This limits wobbling of the coupling 32 when the rotation shaft 7 wobbles.

The advantages of the present embodiment will now be described.

(1) The drive side clearance G1 allows the drive side insertion portion 11 to move in the drive shaft insertion bore 42 in the radial direction of the drive side insertion portion 11 (longitudinal direction of drive shaft insertion bore 42 in present embodiment). Thus, even when the rotation shaft 7 wobbles, the drive side insertion portion 11 moves in the drive shaft insertion bore 42 in the longitudinal direction of the drive shaft insertion bore 42. This limits wobbling of the coupling 32 when the rotation shaft 7 wobbles. Since wobbling of the coupling 32 is limited, the generation of noise that would be generated by the wobbling of the coupling 32 is limited. The driven side insertion portion 72 is movable in the driven shaft insertion bore 45 in the longitudinal direction of the driven shaft insertion bore 45. Further, the drive side insertion portion 11 is movable in the drive shaft insertion bore 42 in the longitudinal direction of the drive shaft insertion bore 42. This allows misalignment of the rotation shaft 7 and the worm 24 to be tolerated by the rotation shaft 7 in addition to the worm 24. Thus, larger misalignments of the rotation shaft 7 and the worm 24 may be tolerated. Since wobbling of the coupling 32 with the rotation shaft 7 is limited, situations are limited in which the coupling 32 is greatly misaligned from the axis of the worm 24.

(2) The flat surfaces 42a defined by the wall surfaces of the drive shaft insertion bore 42 restrict movement of the drive side insertion portion 11 in the lateral direction of the drive shaft insertion bore 42. This allows the rotation shaft 7 and the coupling 32 to be axially aligned in the lateral direction of the drive shaft insertion bore 42. Each longitudinal end of the drive shaft insertion bore 42 includes the drive side clearance G1. This allows the drive side insertion portion 11 to move in the drive shaft insertion bore 42 in the longitudinal direction. Accordingly, when the rotation shaft 7 wobbles, the drive side insertion portion 11 moves in the drive shaft insertion bore 42 in the longitudinal direction of the drive shaft insertion bore 42. This limits wobbling of the coupling 32 with the rotation shaft 7. As a result, noise that would be generated when the coupling 32 wobbles is limited.

(3) The longitudinal direction of the drive shaft insertion bore 42 is shifted from the longitudinal direction of the driven shaft insertion bore 45 by 90° in the rotation direction of the rotation shaft 7. Accordingly, when the rotation shaft 7 and the worm 24 are axially misaligned in the longitudinal direction of the drive shaft insertion bore 42 and the longitudinal direction of the driven shaft insertion bore 45, axial misalignment of the rotation shaft 7 and the worm 24 is allowed in the widest range.

(4) When the rotation shaft 7 wobbles, the drive side insertion portion 11 contacts the drive side elastic member 43. This absorbs the impact produced when the drive side insertion portion 11 strikes the wall surface of the drive shaft insertion bore 42.

(5) The two pushing portions 43a of the drive side elastic member 43 push the drive side insertion portion 11 toward the inner side in the radial direction from opposite sides in the lateral direction of the drive shaft insertion bore 42. Accordingly, the pushing portions 43a of the drive side elastic member 43 restrict separation of the coupling 32 from the rotation shaft 7. Further, the two pushing portions 43a of the drive side elastic member 43 push the drive side insertion portion 11 toward the inner side in the radial direction from opposite sides in the lateral direction of the drive shaft insertion bore 42 and restrict separation of the coupling 32 from the rotation shaft 7 even though the drive side elastic member 43 does not push the drive side insertion portion 11 toward the inner side in the radial direction from opposite sides in the lateral direction of the drive side elastic member 43. This allows the drive side insertion portion 11 to easily move in the drive shaft insertion bore 42 in the longitudinal direction of the drive shaft insertion bore 42. Thus, wobbling of the coupling 32 with the rotation shaft 7 may be limited while restricting separation of the coupling 32 from the rotation shaft 7. The pushing portions 43a transmit rotation from the rotation shaft 7 to the coupling 32 and absorb impacts between the drive side insertion portion 11 and the coupling 32.

(6) The abutment surface 42e of the coupling 32 includes the toleration projections 44 that project in the axial direction. The shoulders 11b of the drive side insertion portion 11 abut against the abutment surface 42e at the distal ends of the toleration projections 44. Accordingly, when the rotation shaft 7 wobbles, the portion of contact between the shoulders 11b and the abutment surface 42e does not interfere with the movement of the rotation shaft 7. This allows axial misalignment of the rotation shaft 7 and the worm 24 to be further tolerated when the rotation shaft 7 wobbles. As a result, wobbling of the coupling 32 with the rotation shaft 7 is limited with further ease.

(7) The worm 24 receives load in the radial direction from the worm wheel 27, which is engaged with the worm 24. In such a motor, the driven side insertion portion 72 is movable in the driven shaft insertion bore 45 in the longitudinal direction of the driven shaft insertion bore 45. Further, the drive side insertion portion 11 is movable in the drive shaft insertion bore 42 in the longitudinal direction of the drive shaft insertion bore 42. Accordingly, axial misalignment of the rotation shaft 7 and the worm 24 are allowed at the rotation shaft side in addition to the worm side. This allows for the toleration of greater misalignments of the rotation shaft 7 and the worm 24.

(8) Each roller 34 is held between two of the roller supports 62, each including the outer holding portion 65 and the inner holding portion 66. The outer holding portions 65 and the inner holding portions 66 contact the outer surface of the roller 34 and restricts movement of the roller 34 relative to the support member 33 in the radial direction and the circumferential direction. Accordingly, when the motor is driven, that is, when the rotation shaft 7 is rotated and the rollers 34 are rotated about the axis of the driven side rotor 35 together with the driven side rotor 35, the rollers 34 are held so as not to strike the clutch housing 31 and the control surfaces 73. As a result, during rotation of the rotation shaft 7, the generation of noise between the rollers 34 and the clutch housing 31 or the control surfaces 73 is limited.

It should be apparent to those skilled in the art that the present invention may be embodied in many other specific forms without departing from the spirit or scope of the invention. Particularly, it should be understood that the present invention may be embodied in the following forms.

In the above embodiment, the clutch 3 is used to connect the rotation shaft 7 and the worm 24 in a motor. The clutch may also be used to connect a drive shaft, which is rotated, and a driven shaft, which receives the rotation of the drive shaft, in a device other than the motor. The clutch 3 may be omitted, and the motor may include only the joint structure R that uses the coupling 32 to connect the rotation shaft 7 and the worm 24 in an integrally rotatable manner. Further, the joint structure R may be used in a device other than the motor described above as long as it connects a drive shaft, which is rotated, and a driven shaft, which receives the rotation of the drive shaft.

Figure 10:
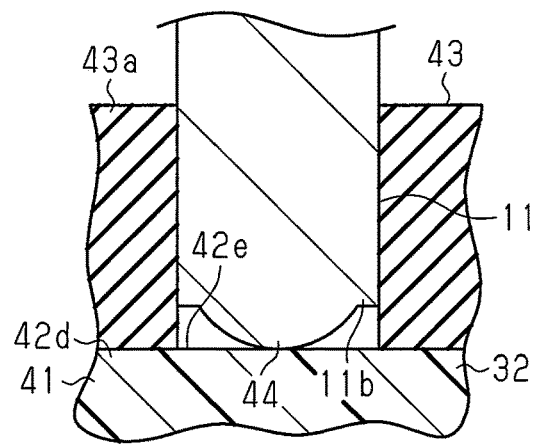
FIG. 10 is a partially enlarged cross-sectional view showing a clutch of a further embodiment.
Figure 11:
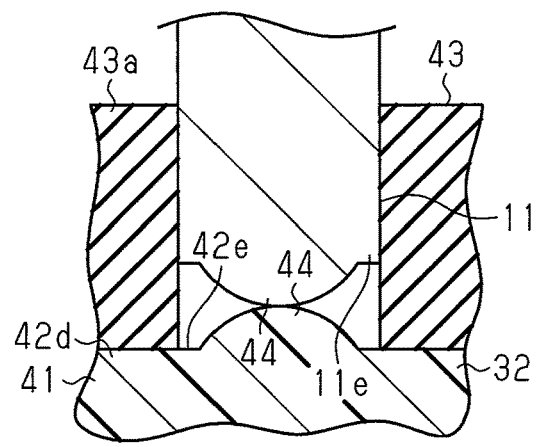
FIG. 11 is a partially enlarged cross-sectional view showing a clutch of a further embodiment.

In the above embodiment, the abutment surface 42e of the coupling 32 includes the toleration projections 44. However, as shown in FIG. 10, instead of the abutment surface 42e, the shoulders 11b may include the toleration projections 44. In this case, the shoulders 11b abut against the abutment surface 42e at the distal end of each toleration projection 44 that projects in the axial direction (vertical direction in FIG. 10). Further, as shown in FIG. 11, the shoulders 11b and the abutment surface 42e may each include the toleration projections 44. In this case, the shoulders 11b and the abutment surface 42e abut against each other in the axial direction at the distal ends of the toleration projections 44. This also obtains advantage (6) of the above embodiment. Each toleration projection 44 does not need to have a spherical shape and only needs to project in the axial direction. For example, the toleration projection 44 may have the form of a triangular pyramid, a cone, a truncated cone, or a box.

Figure 12:
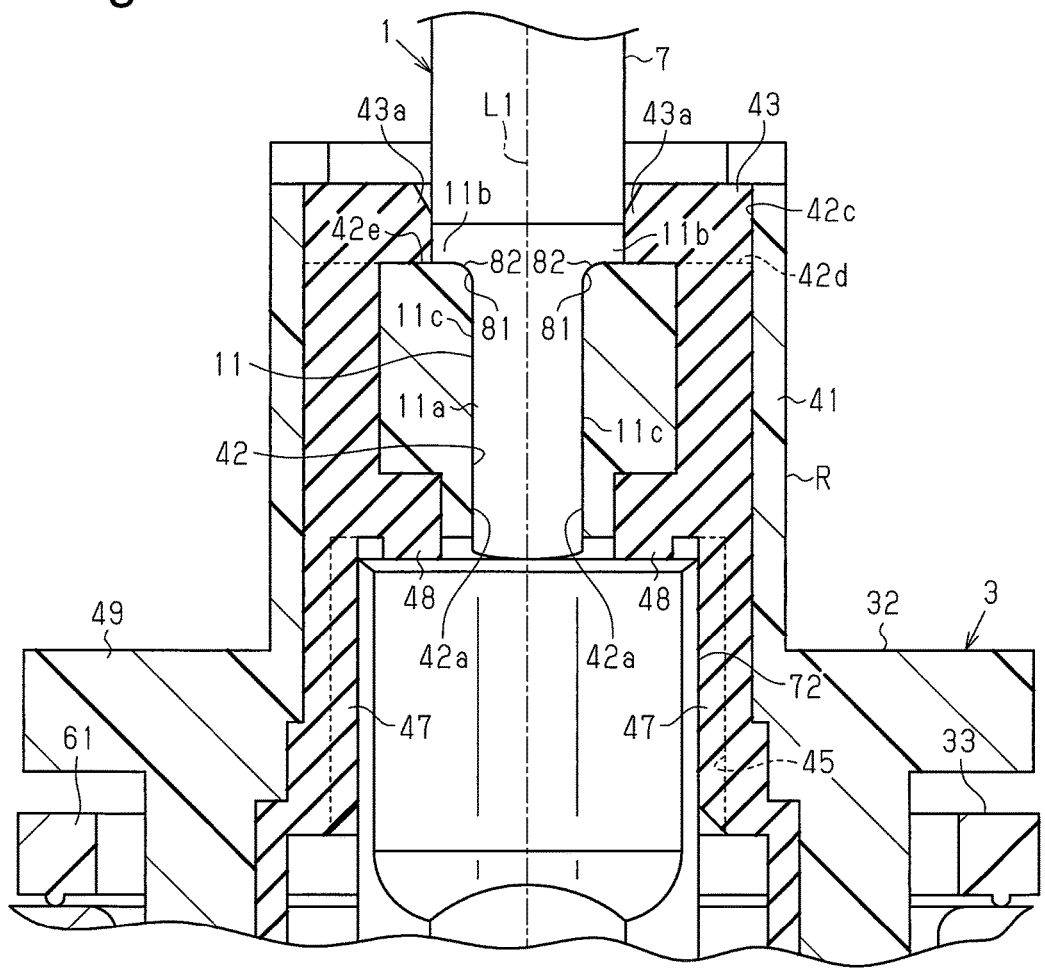
FIG. 12 is a partially enlarged cross-sectional view showing a clutch of a further embodiment.

The shoulders 11b and the abutment surface 42e do not necessarily have to be provided with the toleration projections 44. In this case, as shown in FIG. 12, the joint structure R may include a curved corner 81, which is located at the boundary between the shank 11a and each shoulder 11b, and a curved edge 82, which is obtained by chamfering the edge of the step 42d in a curved manner. In the example shown in FIG. 12, the curved corner 81 is in planar contact with the curved edge 82. This structure restricts the concentration of stress when the rotation shaft 7 wobbles at the boundary of the shank 11a and the shoulder 11b and at the edge of the step 42d. Further, when the rotation shaft 7 wobbles and causes the drive side insertion portion 11 and the coupling 32 to strike each other, breakage is limited at the boundary of the shank 11a and the shoulder 11b and at the edge of the step 42d. In the example shown in FIG. 12, the joint structure R includes both of the curved corner 81 and the curved edge 82 but may include only one of the curved corner 81 and the curved edge 82. This would also obtain the same advantage.

The drive side elastic member 43 does not necessarily have to be provided with the pushing portions 43a.

In the above embodiment, the drive side elastic member 43 is arranged on the step 42d in the drive shaft insertion bore 42. However, the drive side elastic member 43 does not have to be arranged on the step 42d and may be arranged on the wall surface of the drive shaft insertion bore 42. For example, the drive side elastic member 43 may be arranged on the flat surface 42a in a manner allowing for contact with the drive side insertion portion 11. This obtains advantage (4) of the above embodiment. Further, the coupling 32 does not necessarily have to include the drive side elastic member 43.

The drive shaft insertion bore 42 does not necessarily have to include the step 42d. In this case, only the shank 11a of the rotation shaft 7 is inserted into the drive shaft insertion bore 42, and the shoulders 11b abut against the axial end surface of the shaft coupling portion 41 near the motor unit 1 in the axial direction. That is, the drive side insertion portion 11 includes only the shank 11a.

In the above embodiment, the longitudinal direction of the drive shaft insertion bore 42 and the longitudinal direction of the driven shaft insertion bore 45 are shifted apart by 90° in the rotation direction (circumferential direction) of the rotation shaft 7. However, the longitudinal direction of the drive shaft insertion bore 42 and the longitudinal direction of the driven shaft insertion bore 45 do not have to be shifted apart by 90° in the rotation direction (circumferential direction) of the rotation shaft 7. As long as the longitudinal direction of the drive shaft insertion bore 42 and the longitudinal direction of the driven shaft insertion bore 45 are shifted apart by an angle other than 90°, axial misalignment of the rotation shaft 7 and the worm 24 can be tolerated in the longitudinal direction of the drive shaft insertion bore 42 and the longitudinal direction of the driven shaft insertion bore 45. In this case, compared with when the longitudinal direction of the drive shaft insertion bore 42 is the same as the longitudinal direction of the driven shaft insertion bore 45, a larger misalignment of the rotation shaft 7 and the worm 24 can be tolerated. Further, the longitudinal direction of the drive shaft insertion bore 42 may be the same as the longitudinal direction of the driven shaft insertion bore 45. This obtains advantage (1) of the above embodiment.

In the above embodiment, the shank 11a of the drive side insertion portion 11 includes two parallel flat surfaces. However, the distal portion of the drive side insertion portion 11 does not have to include two parallel flat surfaces as long as it is shaped to in a manner allowing for engagement with the wall surface of the drive shaft insertion bore 42 in the rotation direction. For example, the drive side insertion portion 11 may have a D-shaped cross-section. In the same manner, the driven side insertion portion 72 may have any shape, such as a D-shaped cross-section, allowing for engagement with the wall surface of the driven shaft insertion bore in the rotation direction.

In the above embodiment, the drive shaft insertion bore 42 and the driven shaft insertion bore 45 are in communication with each other. However, the drive shaft insertion bore 42 and the driven shaft insertion bore 45 may be disconnected from each other in the axial direction.

In the above embodiment, the drive shaft insertion bore 42 includes two parallel flat surfaces. However, the drive shaft insertion bore 42 does not have to be shaped in such a manner. The drive shaft insertion bore 42 only needs to include a wall surface that engages the inserted drive side insertion portion 11 in the rotation direction and be shaped to include the drive side clearances G1 that allow the drive side insertion portion 11 to move in the radial direction inside the drive shaft insertion bore 42. The term "radial direction" refers to the direction that is orthogonal to the rotation direction of the rotation shaft 7 (or coupling 32) and orthogonal to the axial direction of the rotation shaft 7 (or coupling 32). For example, the drive shaft insertion bore 42 may have another shape (e.g., rectangular shape) that extends in the lateral direction and the longitudinal direction. Further, the drive shaft insertion bore 42 may be quadrangular as long as it includes the drive side clearances G1 that allows the drive side insertion portion 11 to move in the radial direction. In the same manner, the driven shaft insertion bore 45 may have any shape as long as it includes the driven side clearances G2, which allow the driven side insertion portion 72 to be moved in the radial direction inside the driven shaft insertion bore 45, between the driven side insertion portion 72 and the wall surface of the driven shaft insertion bore 45. For example, the driven shaft insertion bore 45 may have any shape (e.g., rectangular or quadrangular) that extends in the lateral direction and the longitudinal direction.

In the above embodiment, the wall surface of the driven shaft insertion bore 45 includes the buffers 46 and the driven side elastic member 47. However, the buffers 46 and the driven side elastic member 47 do not necessarily have to be arranged on the wall surface of the driven shaft insertion bore 45.

Figure 13:
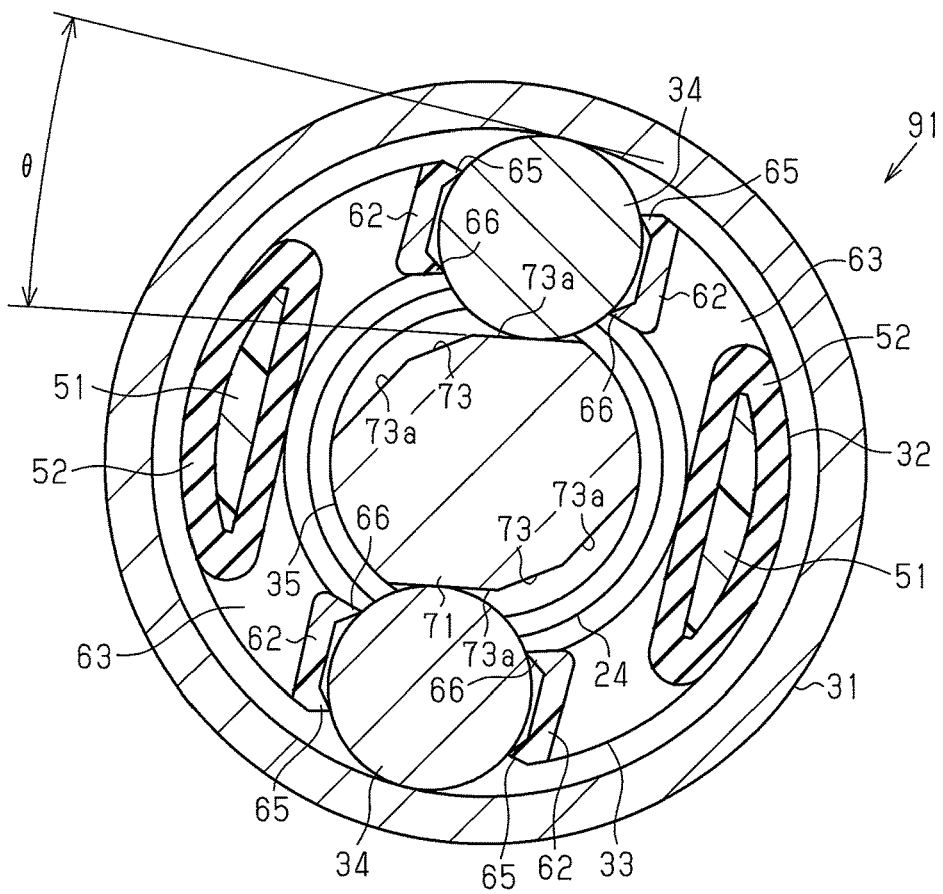
FIG. 13 is a partially enlarged cross-sectional view showing a clutch of a further embodiment.

As shown in FIG. 13, each control surface 73 may include inclined surfaces 73*a* at the two circumferential ends. The inclined surfaces 73*a* are inclined relative to the circumferentially central portion of the control surface 73. FIG. 13 shows a clutch 91 that differs from the clutch 3 of the above embodiment only in the control surface 73. The inclined surfaces 73*a* are inclined so that the circumferential ends of each control surface 73 are farther from the wall surface of the clutch housing 31 than the circumferentially central portion of the control surface 73. Each inclined surface 73*a* is flat and extends in the axial direction. In the clutch 91, if the worm 24 acts to rotate when the motor unit 1 is stopped, the inclined surface 73*a* located at the rear of each control surface in the rotation direction of the worm 24 pushes the roller 34 located between the inclined surface 73*a* and the wall surface of the clutch housing 31 toward the outer side in the radial direction. In FIG. 13, the worm 24 (driven side rotor 35) acts to rotate in the counterclockwise direction. The roller 34 pushed by the inclined surface 73*a* elastically deforms the roller supports 62 holding the roller 34 and force the outer holding portions 65 apart from each other. Consequently, the roller 34 moves toward the outer side in the radial direction and abuts against the inner surface of the clutch housing 31. The roller 34 is held between the inclined surface 73*a* and the inner surface of the clutch housing 31. As a result, the clutch housing 31 and the roller 34 restrict further rotation of the driven side rotor 35.

In this manner, when each control surface 73 includes the inclined surfaces 73*a*, a wedge angle θ, at which the roller 34 is held between the control surface 73 and the inner surface of the clutch housing 31, can easily be changed without enlarging the clutch 91 or adding components to the clutch 91. The wedge angle θ, as viewed in the axial direction, is the angle of the portion of the control surface 73 contacting the roller 34 from a tangent on the inner surface of the clutch housing 31 extending through a point contacting the roller 34. The wedge angle θ may be changed to restrict separation of the roller 34 from between the control surface 73 and the inner surface of the clutch housing 31 so that the driven side rotor 35 does not rotate.

Figure 14:
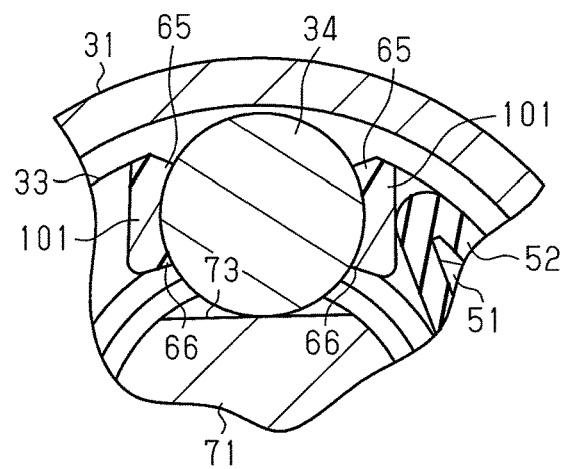
FIG. 14 is a partially enlarged cross-sectional view showing a clutch of a further embodiment.

The roller supports 62 are not limited to the shape of the above embodiment. FIG. 14 shows an example of roller supports 101. The opposing side surfaces of the two roller supports 101 each include the outer holding portion 65 and the inner holding portion 66. The opposing side surfaces of the two roller supports 101 are curved in conformance with the surface of the roller 34 and contact the surface of the roller 34. The two roller supports 101 restrict movement of the roller 34, which is held between the roller supports 101, relative to the support member 33 in the radial direction and the circumferential direction. This obtains advantage (8) of the above embodiment. The two roller supports 62 do not necessarily have to restrict movement of the roller 34 relative to the support member 33 in the circumferential direction.

The present examples and embodiments are to be considered as illustrative and not restrictive, and the invention is not to be limited to the details given herein, but may be modified within the scope and equivalence of the appended claims.

The invention claimed is:

1. A joint structure for connecting a drive shaft and a driven shaft in an integrally rotatable manner, the joint structure comprising:
   a drive side insertion portion defined by a distal portion of the drive shaft;
   a driven side insertion portion defined by a basal portion of the driven shaft; and
   a coupling including a drive shaft insertion bore, into which the drive side insertion portion is inserted, and a driven shaft insertion bore, into which the driven side insertion portion is inserted, wherein the drive shaft insertion bore includes a wall surface engaged with the drive side insertion portion in a rotation direction, and the driven shaft insertion bore includes a wall surface engaged with the driven side insertion portion in a rotation direction; and
   a drive side elastic member, wherein
   the drive shaft insertion bore includes a drive side clearance between the drive side insertion portion and the wall surface of the drive shaft insertion bore, wherein the drive side clearance allows the drive side insertion portion to move in a radial direction inside the drive shaft insertion bore,
   the driven shaft insertion bore includes a driven side clearance between the driven side insertion portion and the wall surface of the driven shaft insertion bore, wherein the driven side clearance allows the driven side insertion portion to move in a radial direction inside the driven shaft insertion bore,
   the drive shaft insertion bore extends in a lateral direction and a longitudinal direction,
   the wall surface of the drive shaft insertion bore includes two lateral ends that engage the drive side insertion portion in the rotation direction,
   the driven shaft insertion bore extends in a lateral direction and a longitudinal direction,
   the wall surface of the driven shaft insertion bore includes two lateral ends that are engageable with the driven side insertion portion in the rotation direction,
   the drive shaft insertion bore restricts movement of the drive side insertion portion in the lateral direction of the drive shaft insertion bore with the wall surface of the drive shaft insertion bore,
   the drive side clearance is defined by a longitudinal end of the drive shaft insertion bore,
   the driven side clearance is defined by a longitudinal end of the driven shaft insertion bore, and
   the drive side elastic member is arranged at a radially outer side of the wall surface of the drive shaft insertion bore.

2. The joint structure according to claim 1, wherein
   the drive side insertion portion includes a shank, which is located at a distal portion of the drive shaft, and a shoulder, which is located at a basal end of the shank;
   the shank includes two flat surfaces extending parallel to each other;
   the shoulder projects from opposite sides of the shank in the lateral direction; and
   the drive side elastic member pushes the shoulder toward an inner side in the radial direction from two lateral sides of the drive shaft insertion bore.

3. The joint structure according to claim 2, wherein the longitudinal direction of the drive shaft insertion bore is shifted from the longitudinal direction of the driven shaft insertion bore in a rotation direction of the drive shaft.

4. The joint structure according to claim 3, wherein the longitudinal direction of the drive shaft insertion bore is shifted from the longitudinal direction of the driven shaft insertion bore by 90° in the rotation direction of the drive shaft.

5. The joint structure according to claim 2, wherein
a portion of the drive shaft insertion bore that opens near a motor unit defines a large diameter portion, and
the drive side elastic member is arranged on a wall surface of the large diameter portion.

6. The joint structure according to claim 5, wherein the drive side elastic member pushes the drive side insertion portion toward an inner side in the radial direction from two lateral sides of the drive shaft insertion bore.

7. The joint structure according to claim 2, wherein
the drive side insertion portion includes a shank, which is located at a distal portion of the drive shaft, and a shoulder, which is located at a basal end of the shank;
the shank includes two flat surfaces extending parallel to each other;
the shoulder projects from opposite sides of the shank in the lateral direction;
the coupling includes an abutment surface against which the shoulder is abutted in an axial direction; and
at least one of the shoulder and the abutment surface includes a toleration projection that projects in the axial direction.

8. The joint structure according to claim 2, wherein
the drive side insertion portion includes a shank, which is located at a distal portion of the drive shaft, and a shoulder, which is located at a basal end of the shank;
the shank includes two flat surfaces extending parallel to each other;
the shoulder projects from opposite sides of the shank in the lateral direction;
the coupling includes a step abutted against a boundary of the shank and the shoulder;
the joint structure includes at least one of a curved corner that is located at the boundary of the shank and the shoulder in the drive side insertion portion and a curved edge that is obtained by chamfering a corner of the step in a curved manner in the coupling.

9. A clutch comprising:
the joint structure according to claim 1;
wherein the clutch is configured to transmit rotation of the drive shaft to the driven shaft and restrict transmission of rotation from the driven shaft to the drive shaft.

10. A motor comprising:
the joint structure according to claim 1;
a motor unit that includes the drive shaft, wherein the motor unit rotates the drive shaft; and
a reduction gear that includes the driven shaft, wherein the rotation of the drive shaft is transmitted to the driven shaft, and the reduction gear reduces the rotation of the drive shaft in speed.

11. A motor comprising:
the clutch according to claim 9;
a motor unit that includes the drive shaft, wherein the motor unit rotates the drive shaft; and
a reduction gear that includes the driven shaft, wherein the rotation of the drive shaft is transmitted to the driven shaft, and the reduction gear reduces the rotation of the drive shaft in speed.

12. A motor comprising:
the joint structure according to claim 1;
a motor unit that includes the drive shaft, wherein the motor unit rotates the drive shaft; and
a reduction gear that includes the driven shaft, which is a worm, and a worm wheel, which is engaged with the driven shaft, wherein the rotation of the drive shaft is transmitted to the worm, and the reduction gear reduces the rotation of the drive shaft in speed.

13. A joint structure for connecting a drive shaft and a driven shaft in an integrally rotatable manner, the joint structure comprising:
a drive side insertion portion defined by a distal portion of the drive shaft;
a driven side insertion portion defined by a basal portion of the driven shaft;
a coupling including a drive shaft insertion bore, into which the drive side insertion portion is inserted, and a driven shaft insertion bore, into which the driven side insertion portion is inserted, wherein the drive shaft insertion bore includes a wall surface engaged with the drive side insertion portion in a rotation direction, and the driven shaft insertion bore includes a wall surface engaged with the driven side insertion portion in a rotation direction; and
a drive side elastic member, wherein
the drive shaft insertion bore includes a drive side clearance between the drive side insertion portion and the wall surface of the drive shaft insertion bore, wherein the drive side clearance allows the drive side insertion portion to move in a radial direction inside the drive shaft insertion bore,
the driven shaft insertion bore includes a driven side clearance between the driven side insertion portion and the wall surface of the driven shaft insertion bore, wherein the driven side clearance allows the driven side insertion portion to move in a radial direction inside the driven shaft insertion bore,
the drive shaft insertion bore extends in a lateral direction and a longitudinal direction,
the wall surface of the drive shaft insertion bore includes two lateral ends that engage the drive side insertion portion in the rotation direction,
the driven shaft insertion bore extends in a lateral direction and a longitudinal direction,
the wall surface of the driven shaft insertion bore includes two lateral ends that are engageable with the driven side insertion portion in the rotation direction,
the drive shaft insertion bore restricts movement of the drive side insertion portion in the lateral direction of the drive shaft insertion bore with the wall surface of the drive shaft insertion bore,
the drive side clearance is defined by a longitudinal end of the drive shaft insertion bore,
the driven side clearance is defined by a longitudinal end of the driven shaft insertion bore,
the drive side insertion portion includes a shank, which is located at a distal portion of the drive shaft, and a shoulder, which is located at a basal end of the shank,
the shank includes two flat surfaces extending parallel to each other,
the shoulder projects from opposite sides of the shank in the lateral direction,
the coupling includes an abutment surface against which the shoulder is abutted in an axial direction, and at least one of the shoulder and the abutment surface includes a toleration projection that projects in the axial direction.

* * * * *